I. H. Chappell,
Corn Planter,
Nº 71,134. Patented Nov. 19, 1867.
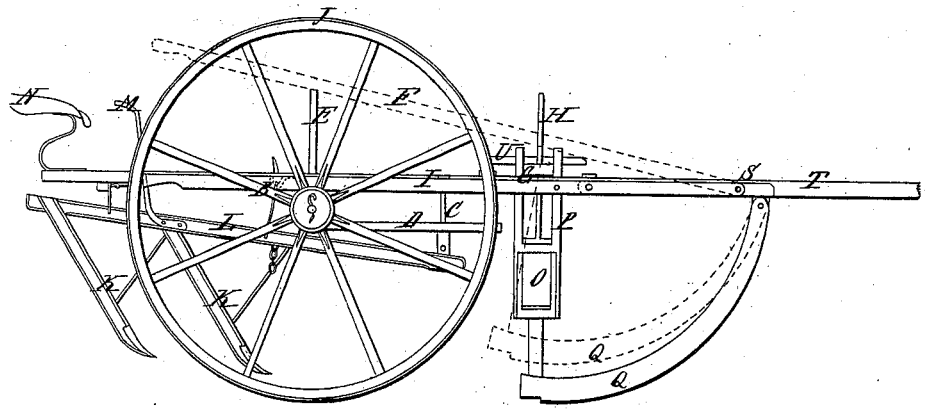
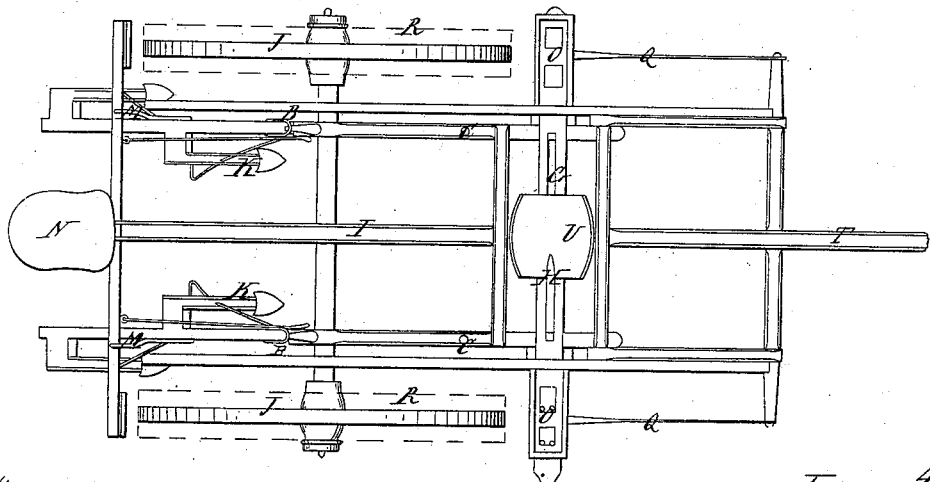
Witnesses
Wm A King
Inventor
Isaac H Chappell
by his atty
Thos S Sprague

United States Patent Office.

ISAAC H. CHAPPELL, OF DECATUR, ILLINOIS.

Letters Patent No. 71,184, dated November 19, 1867.

IMPROVEMENT IN COMBINED PLANTER AND CULTIVATOR.

*The Schedule referred to in these Letters Patent and making part of the same.*

TO WHOM IT MAY CONCERN:

Be it known that I, ISAAC H. CHAPPELL, of Decatur, in the county of Macon, and State of Illinois, have invented a new and improved method of building a Combined Planter and Cultivator; and I do declare that the following is a true and accurate description thereof, reference being had to the accompanying drawings, and to the letters of reference marked thereon, and being a part of this specification.

Figure 1 is a side elevation of my invention.

Figure 2 is a top view of the same.

The same letters refer to similar parts in each figure.

I make a suitable frame, I, supported on wheels J. To this frame I attach right and left-hand cultivators K K, by means of the links and hooks B B, which allow them to be unshipped at pleasure. The fronts of the cultivator-beams L are attached to the frame I by the connecting-rods C, in fig. 1, at C C in fig. 2, which allow the cultivator to be governed by the guide-handles M M, so as to operate over a wider or narrower space of ground. These connecting-rods C pass through the steadying-bars D. By unscrewing the nuts at C C, fig. 2, and unhooking the links from the hooks B, the cultivators can be entirely detached from the frame I. N is the driver's seat, when the cultivator is in use. In front of the wheels I attach the planters O O by the frame P. These planters are of the ordinary description, and I make no claim upon anything but the manner of attachment. On top of the frame P, I place the slotted bar G, through which the lever H passes. This lever is for the purpose of operating the slides of the planter to drop the grain where required. U is a seat for the operator, when the planter is being used; he works the lever H, and drops his grain where he requires. Q Q are cutters to open the earth in front of the teeth, which conduct the grain into the furrow thus opened. R R, shown in red lines in fig. 2, are separate wide adjustable tires, to be attached to the wheels J J, to cover the grain when dropped into the furrow. These tires can be easily removed, when desired, and should be removed when the planters are not in use. F, shown in red lines in fig. 1, are levers, with fulcrums at S. When I wish to use the cultivators without the planters, I raise the levers F and place them on top of the crotched stakes E, which raise the entire planters from the ground. T is a proper tongue, to which to attach the team to draw the machine.

What I claim as my invention, and desire to secure by Letters Patent, is—

1. The wide tires R R, when attached substantially as described, for the purpose specified.

2. The links and hooks B B, with the connecting-rods C C and steadying-bar D, arranged substantially as described, for the purpose designed.

3. The crotched stakes E and levers F, arranged substantially as set forth, for the purpose specified.

4. The slotted bar G and lever H, for the purpose designed.

5. The combination of the cultivator and planter, when built substantially as hereinbefore set forth, and for the purposes specified.

ISAAC H. CHAPPELL.

Witnesses:
WM. A. KRAG,
H. G. HANNAMAN.